(12) United States Patent
Langlotz

(10) Patent No.: US 10,233,272 B2
(45) Date of Patent: Mar. 19, 2019

(54) METHOD FOR PRODUCING WATER-SOLUBLE HOMOPOLYMERS OR COPOLYMERS WHICH COMPRISE (METH)ACRYLAMIDE

(71) Applicant: BASF SE, Ludwigshafen (DE)

(72) Inventor: Björn Langlotz, Trostberg (DE)

(73) Assignee: BASF SE (DE)

( * ) Notice: Subject to any disclaimer, the term of this patent is extended or adjusted under 35 U.S.C. 154(b) by 35 days.

(21) Appl. No.: 15/303,695

(22) PCT Filed: Apr. 10, 2015

(86) PCT No.: PCT/EP2015/056531
§ 371 (c)(1),
(2) Date: Oct. 12, 2016

(87) PCT Pub. No.: WO2015/158517
PCT Pub. Date: Oct. 22, 2015

(65) Prior Publication Data
US 2017/0029546 A1    Feb. 2, 2017

(30) Foreign Application Priority Data
Apr. 15, 2014 (EP) .................................. 14164736

(51) Int. Cl.
*C08F 220/56* (2006.01)
*C08F 2/10* (2006.01)
*C08F 2/56* (2006.01)
*C08F 4/04* (2006.01)
*C08F 4/40* (2006.01)

(52) U.S. Cl.
CPC .............. *C08F 220/56* (2013.01); *C08F 2/10* (2013.01); *C08F 4/04* (2013.01); *C08F 4/40* (2013.01)

(58) Field of Classification Search
CPC ........ C08F 220/56; C08F 2/10; C08F 220/06; C08F 220/02; C08F 2216/1433; C08F 4/04; C08F 4/10
USPC ....................................................... 522/175
See application file for complete search history.

(56) References Cited

U.S. PATENT DOCUMENTS

| | | | |
|---|---|---|---|
| 4,306,045 A | 12/1981 | Yoshida et al. | |
| 5,296,577 A | 3/1994 | Tamura et al. | |
| 5,633,329 A | 5/1997 | Hähnle et al. | |
| 6,410,610 B1 * | 6/2002 | Brehm ................. | C08F 220/34 522/84 |
| 7,619,046 B2 | 11/2009 | Broughton et al. | |
| 7,700,702 B2 | 4/2010 | Gaillard et al. | |
| 9,783,730 B2 | 10/2017 | Langlotz et al. | |
| 2014/0131039 A1 | 5/2014 | Reichenbach-Klinke et al. | |
| 2015/0329660 A1 | 11/2015 | Bittner et al. | |
| 2015/0329669 A1 | 11/2015 | Bittner et al. | |
| 2016/0159955 A1 | 6/2016 | Haschick et al. | |
| 2016/0200969 A1 | 7/2016 | Reichenbach-Klinke et al. | |

FOREIGN PATENT DOCUMENTS

| | | |
|---|---|---|
| CA | 2760734 A1 | 11/2010 |
| CA | 2818847 A1 | 5/2012 |
| CA | 2826635 A1 | 10/2012 |
| CN | 1204652 A | 1/1999 |
| DE | 3021767 A1 | 12/1980 |
| DE | 19748153 A1 | 5/1999 |
| GB | 1054028 A | 1/1967 |
| JP | S4927659 B1 | 7/1974 |
| WO | WO-03066190 A1 | 8/2003 |
| WO | WO-2010133258 A1 | 11/2010 |
| WO | WO-2010133527 A2 | 11/2010 |
| WO | WO-2012069478 A1 | 5/2012 |
| WO | WO-2012136613 A1 | 10/2012 |

OTHER PUBLICATIONS

International Preliminary Report on Patentability for Application No. PCT/EP2015/056531, dated Oct. 18, 2016.
International Search Report for PCT/EP2015/056531 dated Jun. 9, 2015.
Chinese Office Action for Chinese Application No. 20150031817.8, dated Nov. 13, 2018.

* cited by examiner

*Primary Examiner* — Sanza L. McClendon
(74) *Attorney, Agent, or Firm* — Drinker Biddle & Reath LLP

(57) ABSTRACT

A process for preparing water-soluble homo- or copolymers comprising (meth)acrylamide by free-radical polymerization of an aqueous solution of monoethylenically unsaturated monomers comprising at least (meth)acrylamide in the presence of at least one stabilizer for prevention of polymer degradation by molecular oxygen. The stabilizer is preferably one selected from the group of sulfur compounds, sterically hindered amines, N-oxides, nitroso compounds, aromatic hydroxyl compounds and ketones, more preferably 2-mercaptobenzothiazole or a salt thereof.

18 Claims, 3 Drawing Sheets

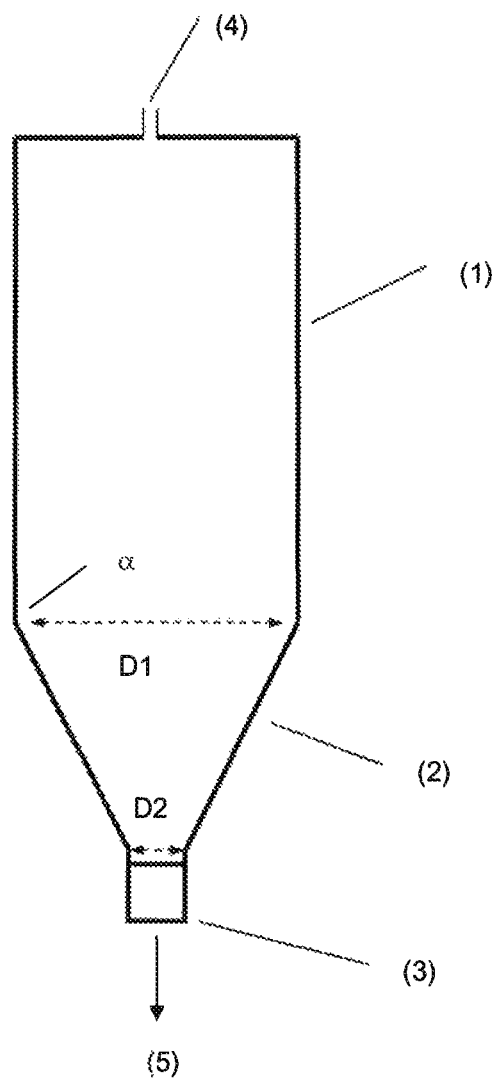
Figure 1: Partly conical reactor

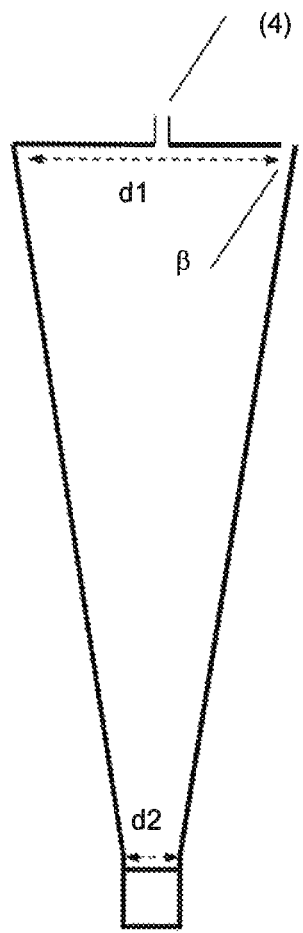
Figure 2: Fully conical reactor

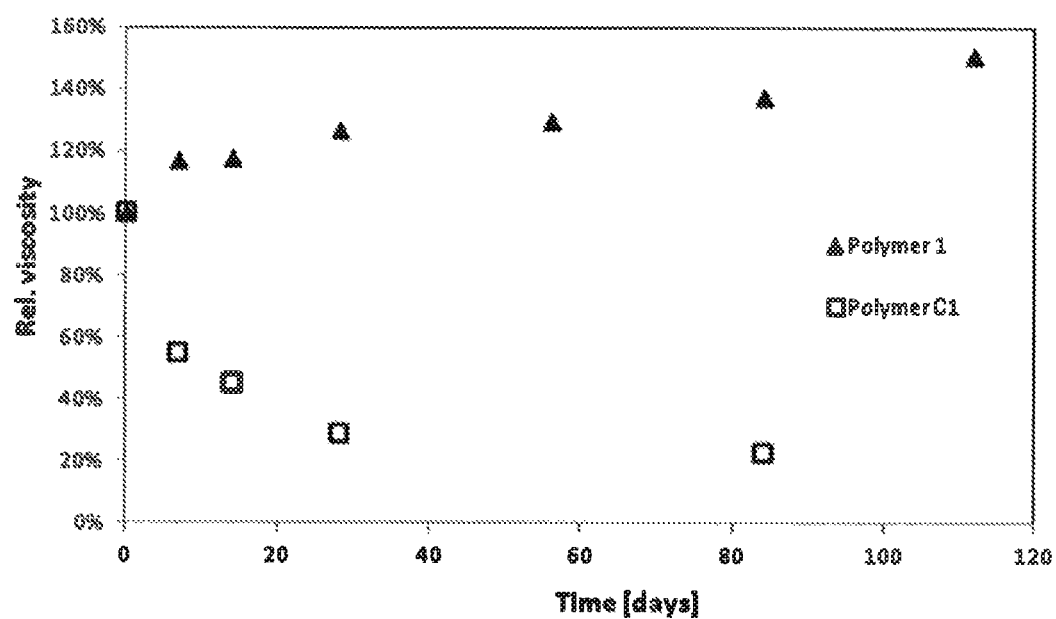
Figure 3: Viscosity of polymers 1 and C1 in long-term test

METHOD FOR PRODUCING WATER-SOLUBLE HOMOPOLYMERS OR COPOLYMERS WHICH COMPRISE (METH)ACRYLAMIDE

CROSS-REFERENCE TO RELATED APPLICATIONS

This application is a national stage application (under 35 U.S.C. § 371) of PCT/EP2015/056531, filed Apr. 10, 2015, which claims benefit of European Application No. 14164736.2, filed Apr. 15, 2014, both applications of which are incorporated herein by reference in their entirety.

The invention relates to processes for preparing water-soluble homo- or copolymers comprising (meth)acrylamide by free-radical polymerization of an aqueous solution of ethylenically unsaturated monomers comprising at least (meth)acrylamide in the presence of at least one stabilizer for prevention of polymer degradation by molecular oxygen. The stabilizer is preferably one selected from the group of sulfur compounds, sterically hindered amines, N-oxides, nitroso compounds, aromatic hydroxyl compounds and ketones, more preferably 2-mercaptobenzothliazole or a salt thereof.

BACKGROUND OF THE INVENTION

High molecular weight homopolyacrylamide and water-soluble polyacrylamide copolymers, for example acrylamide-acrylic acid copolymers or copolymers of acrylamide and cationic comonomers, are known in principle. They are used in many fields of industry, for example as thickeners, flocculants, strengtheners for paper, for oil recovery, or for mining applications. The preparation can be effected especially in the aqueous phase, for example by means of adiabatic gel polymerization.

One application of high molecular weight polyacrylamides is the use thereof for tertiary mineral oil production, specifically for what is called "polymer flooding". This involves injecting aqueous solutions of a thickening polymer through injection wells into a mineral oil deposit, the viscosity of the aqueous polymer solution being matched to the viscosity of the mineral oil. The injection of the polymer solution forces the mineral oil in the mineral oil deposit through fine cavities in the deposit from the injection well proceeding in the direction of a further well, called the production well, and mineral oil is produced through the production well. The use of viscous aqueous polymer solutions rather than water has the advantage that the polymer solution flows through the formation much more homogeneously than water and thus more oil is mobilized than when water is used alone.

The deposit temperature of mineral oil deposits is typically above room temperature, for example 30° C. to 120° C. The aqueous polymer solution flows only very gradually through the formation, such that the residence time of the aqueous polymer solution in the formation is typically several months, and in some circumstances even years. In order to assure the mobilization of mineral oil even over this period, the viscosity of the polymer solution should not drop significantly, if at all. The viscosity of the polymer solution can decrease especially when the polymers are chemically or physically degraded.

One cause of the chemical degradation of polymers can be the presence of oxygen in the polymer solution. The polymer solutions are therefore typically produced on the oilfield by dissolving solid polymer powders in suitable dissolution systems, while attempting to exclude oxygen, for example by working under protective gas.

However, the amounts of polymer solution required for polymer flooding are high. Even for flooding of oilfields of the moderate size, it may be necessary to inject a few thousand $m^3$ of polymer solution per day. In the case of a polymer concentration of 0.2% by weight and an injection rate of 5000 $m^3$ per day, 10 t of solid polymer have to be dissolved per day. Under these conditions, it is difficult or at least costly and inconvenient to completely exclude oxygen. It is therefore common practice to add to the polymer solutions stabilizers or combinations of stabilizers which are supposed to prevent the degradation of the polymer by molecular oxygen or by further reactions induced by molecular oxygen. Stabilizers of this kind may be free-radical scavengers. Free-radical scavengers are supposed to react with free radicals such that the free radical is no longer able to attack and chemically degrade the polymer. Examples of stabilizers of this kind include sulfur compounds, for example 2-mercaptobenzothiazole, or sterically hindered amines. WO 2010/133258 A1 and literature cited therein give an overview of the use of various stabilizers in polymer solutions for prevention of free-radical degradation by molecular oxygen for tertiary mineral oil production.

Stabilizers of this kind can of course be added on dissolution of the solid polymers by the user. However, many users prefer to use polymer granules, polymer powders or other solid polymer preparations that already comprise stabilizers, because this reduces the cost and inconvenience for the end user.

Polyacrylamides and polyacrylamide copolymers comprising stabilizers can be prepared in various ways, for example by mixing solid polymer or a polymer gel with a likewise solid stabilizer in suitable mixers. Finally, the polymer and the stabilizer can be dissolved in water and a mixture of polymer and stabilizer can be precipitated out. The preparation can also be effected by spraying polymer gels or polymer granules with a solution of the stabilizers. This procedure has the disadvantage that the stabilizer has been applied only superficially. In the course of transportation of the polymer granules, for example in big bags, there can always be superficial abrasion. The fines fraction with a high stabilizer content typically collects at the bottom of the transport vessel, while the coarse material at the top lacks stabilizer. If only a portion of the contents is taken from the container, the amount of stabilizer in solution will possibly deviate from the desired value. All the variants mentioned have the disadvantage that it constitutes a further process step, which means additional cost and inconvenience.

JP 74027659 B describes the preparation of polyacrylamides by polymerization of acrylamide in aqueous solution. After the polymerization, the stabilizer is added to the aqueous solution, and polymer and stabilizer are finally coprecipitated out of the aqueous solution by means of suitable precipitants and dried.

The preparation of high molecular weight polyacrylamides can particularly advantageously be undertaken by means of adiabatic gel polymerization. In this case, a solution of acrylamide and optionally water-soluble copolymers is first made up in water. The concentration of the monomers may be 20 to 70% by weight. The solution is polymerized without stirring and the reactor is typically neither heated nor cooled. This gives rise to a solid polymer gel, which is dried and ground to give granules or powder.

WO 2012/069478 A1 discloses a method of tertiary mineral oil production, in which a water-soluble, hydrophobically associating copolymer at least comprising (meth)

acrylamide or derivatives thereof, at least one monomer having acidic groups and at least one monomer having a terminal hydrophobic group is used. The preparation can be effected by means of gel polymerization. For this purpose, first of all, a mixture of the monomers, initiators and optionally further auxiliaries in water or an aqueous solvent mixture is provided. The polymerization can be initiated by photochemical or thermal means. The photochemical polymerization can preferably be conducted at temperatures of −5° C. to 10° C. The thermal polymerization can be initiated using a mixture of a redox initiated system and a water-soluble azo initiator at 0 to 10° C. The heat of reaction released heats the mixture, and a polymer gel is formed.

WO 2012/136613 A1 discloses a method of mineral oil production, in which permeable regions of an underground mineral oil deposit are blocked using an aqueous formulation of a hydrophobic associating copolymer, preferably with crosslinking of the polymers. The hydrophobically associating copolymer comprises at least (meth)acrylamide or derivatives thereof, a monomer having a terminal hydrophobic group and monomers having acidic groups and/or (meth)acrylic esters. The preparation can be effected by means of gel polymerization, the details disclosed in WO 2012/136613 A1 regarding the performance of gel polymerization being the same as in WO 2012/069478 A1.

DE 197 48 153 A1 discloses a process for preparing water-soluble cationic polyelectrolytes by adiabatic photo-polymerization, in which a mixture of nonionic monomers and cationic monomers is undertaken in aqueous solution in the presence of a photoinitiator and of a redox system which is only capable of initiating the polymerization at temperatures≥20° C. The photopolymerization is initiated at temperatures of less than 20° C., preferably less than 10° C., and, as a result of the heating of the mixture because of heat of reaction, the redox system also initiates the polymerization later on in the preparation.

However, none of documents WO 2012/069478 A1, WO 2012/136613 A1 and DE 197 48 153 A1 discloses that stabilizers to prevent polymer degradation by molecular oxygen can be added directly to the mixture to be polymerized.

It is of course possible to mix the solid polymer gel obtained or the dried polymer with a stabilizer in a suitable mixing device, but this again would be one process step more.

There are also known techniques in which the stabilizer, in the case of a gel polymerization, is added at an early stage, before the polymerization.

U.S. Pat. No. 5,296,577 describes a process for preparing polyacrylamides by free-radical polymerization of acrylamide and optionally comonomers in an aqueous medium in the presence of azo initiators and at least 0.1% by weight of the 2-mercaptobenzothiazole stabilizer or a salt thereof at a pH of at least 6, preferably at least 7, within a temperature range from 5 to 100° C. under adiabatic conditions. Even though 2-mercaptobenzothiazole can react with free radicals, it reacts in a non-irreversible and undesirable manner with the azo initiators. In order to obtain high molecular weight polymers with high viscosity, it is desirable to initiate the polymerization at minimum temperature. U.S. Pat. No. 5,296,577, however, teaches that, in the process proposed in U.S. Pat. No. 5,296,577 at a polymerization temperature of less than 5° C., polymerization is retarded so significantly that high molecular weight polyacrylamides are no longer obtained.

DE 30 21 767 A1 describes a process for preparing high molecular weight polyacrylamides by free-radical polymerization in an aqueous medium, in which the polymerization is conducted in the presence of 2-mercaptobenzimidazole. The polymerization can be performed within the temperature range from 0° C. to 100° C. However, the examples disclose only the initiation of the polymerization at 10° C. to 30° C. and pH values ≥7.

DETAILED DESCRIPTION OF THE INVENTION

It was an object of the invention to provide a process for preparing polyacrylamides by means of gel polymerization in the presence of a stabilizer for prevention of oxidative degradation by molecular oxygen, in which the polymerization can also be initiated at temperatures below 5° C.

Accordingly, a process has been found for preparing water-soluble homo- or copolymers comprising (meth)acrylamide by free-radical polymerization, wherein an aqueous solution of ethylenically unsaturated monomers comprising at least (meth)acrylamide is free-radically polymerized in the presence of at least one stabilizer for prevention of polymer degradation by molecular oxygen, wherein the polymerization is a gel polymerization, and wherein the process comprises at least the following steps:

(I) providing an aqueous monomer solution comprising at least
  water,
  25 to 45% by weight—based on the amount of all the components of the aqueous solution—of ethylenically unsaturated monomers (A), where at least 70% by weight of the monomers are monoethylenically unsaturated, hydrophilic monomers (A1), with the proviso that at least one of the monomers (A1) is (meth)acrylamide,
  0.1 to 2% by weight—based on the sum total of all the monomers—of at least one stabilizer (B) for prevention of polymer degradation by molecular oxygen,
  an azo initiator (C) having a 10 h $t_{1/2}$ of 40° C. to 75° C.,
  where the aqueous monomer solution
  has a pH of <7,
  has been cooled to a temperature of <5° C. and
  has been inertized,
(II) adding at least one redox initiator (D) for the free-radical polymerization to the monomer solution which has been cooled to less than 5° C.,
(III) polymerizing the aqueous monomer solution under essentially adiabatic conditions, the initiation temperature of the polymerization being less than 5° C. and the mixture being heated under the influence of the heat of polymerization which develops to a temperature of 60° C. to 100° C., forming a polymer gel, and
(IV) drying the polymer gel obtained.

In a preferred embodiment, the stabilizers are at least one stabilizer selected from the group of sulfur compounds, sterically hindered amines, N-oxides, nitroso compounds, aromatic hydroxyl compounds and ketones.

In a particularly preferred embodiment of the invention, the stabilizer is 2-mercaptobenzothiazole or a salt thereof.

It has been found that, surprisingly, by means of said polymerization process, even at initiation temperatures of less than 5° C., (meth)acrylamide-comprising homo- or copolymers having a high viscosity and a high molecular weight but a low gel content are obtained.

LIST OF FIGURES

FIG. 1: Partly conical reactor for performance of the process according to the invention FIG. 2: Fully conical reactor for performance of the process according to the invention FIG. 3: Graph showing a long-term storage test of polymers 1 and C1

Specific details of the invention are as follows:

The process according to the invention for preparing water-soluble homo- or copolymers of (meth)acrylamide by free-radical polymerization in aqueous solution is a gel polymerization process. In this process, the monomers are used in aqueous solution in a comparatively high concentration, namely 25 to 45% by weight. Because of the high concentration, the mixture does not remain liquid in the course of the polymerization; instead, a solid, water-containing polymer gel is obtained. The stirring of the mixture in the course of the polymerization is of course not possible because of the high viscosity. After the polymerization, the polymer gel can be divided and dried. In this procedure, added auxiliaries and additives necessarily remain in the polymer preparation.

Homo- or Copolymers of (Meth)Acrylamide to be Prepared

By means of the process according to the invention, it is possible to prepare water-soluble homo- or copolymers of (meth)acrylamide. They comprise monoethylenically unsaturated, hydrophilic monomers (A1), where at least one of the monomers is (meth)acrylamide. Optionally, monoethylenically unsaturated, amphiphilic monomers (A2) other than the hydrophilic monomers (A1) and further ethylenicaly unsaturated monomers (A3) may be present.

Hydrophilic Monomers (A1)

The monoethylenic monomers (A1) are hydrophilic. The term "hydrophilic" in the context of this invention means that the monomers (A) are to be soluble in the aqueous solution to be used for polymerization, i.e. a solution comprising 25 to 45% by weight of monomers (A1), in the desired use concentration. It is thus not absolutely necessary that monomers (A) to be used are miscible with water without any gap; instead, it is sufficient if they meet the minimum requirement mentioned. In general, the solubility of the hydrophilic monomers (A) in water at room temperature should be at least 50 g/l, preferably at least 100 g/l and more preferably at least 150 g/l.

Monomers (A1a)

The hydrophilic, monoethylenically unsaturated monomers (A1) may be uncharged monomers (A1a). The monomers (A1a) comprise hydrophilic groups which impart at least a certain water solubility to the monomers. (Meth) acrylamide is a monomer (A1a). Examples of further monomers (A1a) include derivatives of (meth)acrylamlde such as N-methyl(meth)acrylamide, N,N'-dimethyl(meth)acrylamide or N-methylol(meth)acrylamlde.

Further examples include monomers comprising hydroxyl and/or ether groups, for example hydroxyethyl (meth)acrylate, hydroxypropyl (meth)acrylate, allyl alcohol, hydroxyvinyl ethyl ether, hydroxyvinyl propyl ether, hydroxyvinyl butyl ether, polyethylene glycol (meth)acrylate, N-vinylformamide, N-vinylacetamide, N-vinylpyrrolidone or N-vinylcaprolactam, and vinyl esters, for example vinyl formate or vinyl acetate. N-Vinyl derivatives can be hydrolyzed after polymerization to give vinylamine units, and vinyl esters to give vinyl alcohol units.

Monomers (A1b)

Hydrophilic, monoethylenically unsaturated monomers (A1) may be hydrophilic, anionic monomers (A1b) comprising at least one acidic group, or salts thereof.

The acidic groups are preferably acidic groups selected from the group of —COOH, —SO$_3$H and —PO$_3$H$_2$ or salts thereof. Preference is given to monomers comprising COOH groups and/or —SO$_3$H groups, particular preference to monomers comprising —SO$_3$H groups. The salts of the acidic monomers may of course also be involved. Suitable counterions include especially alkali metal ions such as Li$^+$, Na$^+$ or K$^+$, and also ammonium ions such as NH$_4^+$ or ammonium ions having organic radicals. Examples of ammonium ions having organic radicals include [NH(CH$_3$)$_3$]$^+$, [NH$_2$(CH$_3$)$_2$]$^+$, [NH$_3$(CH$_3$)]$^+$, [NH(C$_2$H$_5$)$_3$]$^+$, [NH$_2$(C$_2$H$_5$)$_2$]$^+$, [NH$_3$(C$_2$H$_5$)]$^+$, [NH$_3$(CH$_2$CH$_2$OH)]$^+$, [H$_3$N—CH$_2$CH$_2$—NH$_3$]$^{2+}$ or [H(H$_3$C)$_2$N—CH$_2$CH$_2$CH$_2$NH$_3$]$^{2+}$.

Examples of monomers (A1b) comprising COOH groups include acrylic acid, methacrylic acid, crotonic acid, itaconic acid, maleic acid or fumaric acid. Preference is given to acrylic acid.

Examples of monomers (A1b) comprising sulfo groups include vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to vinylsulfonic acid, allylsulfonic acid or 2-acrylamido-2-methylpropanesulfonic acid and particular preference to 2-acrylamido-2-methylpropenesulfonic acid (APMS) or salts thereof.

Examples of monomers (A1b) comprising phosphonic acid groups include vinylphosphonic acid, allylphosphonic acid, N-(meth)acrylamidoalkylphosphonic acids or (meth) acryloyloxyalkyl-phosphonic acids, preferably vinylphosphonic acid.

Preferably, monomer (A1b) may be selected from the group consisting of acrylic acid, methacrylic acid, crotonic acid, itaconic acid, maleic acid, fumaric acid, vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutane-sulfonic acid, 2-acrylamido-2,4,4-trimethylpentanesulfonic acid, vinylphosphonic acid, allylphosphonic acid, N-(meth)acrylamidoalkcylphosphonic acids and (meth)acryloyloxyalkyl-phosphonic acids, more preferably from acrylic acid and/or APMS or salts thereof.

Monomers (A1c)

Further, monoethylenically unsaturated, hydrophilic monomers may be hydrophilic, cationic monomers (A1c). Suitable cationic monomers (A1c) include especially monomers having ammonium groups, especially ammonium derivatives of N-(ω-aminoalkyl)(meth)acrylamides or ω-aminoalkyl (meth)acrylates.

More particularly, monomers (A1c) having ammonium groups may be compounds of the general formulae H$_2$C═C(R$^1$)—CO—NR$^2$—R$^3$—N(R$^4$)$_3^+$ X$^-$ (Ia) and/or H$_2$C═C(R$^1$)—COO—R$^3$—N(R$^4$)$_3^+$ X$^-$ (Ib). In these formulae, R$^1$ is H or methyl, R$^2$ is H or a C$_1$- to C$_4$-alkyl group, preferably H or methyl, and R$^4$ is a preferably linear C$_1$- to C$_4$-alkylene group, for example a 1,2-ethylene group —CH$_2$—CH$_2$— or a 1,3-propylene group —CH$_2$—CH$_2$—CH$_2$—. The R$^4$ radicals are each independently C$_1$- to C$_4$-alkyl radicals, preferably methyl or a group of the general formula —R$^5$—SO$_3$H where R$^5$ is a preferably linear C$_1$- to C$_4$-alkylene group or a phenyl group, with the proviso that generally not more than one of the R$^4$ substituents is a substituent having sulfo groups. More preferably, the three R$^4$ substituents are methyl groups, meaning that the monomer has an —N(CH$_3$)$_3^+$ group. X$^-$ in the above formula is a monovalent anion, for example Cl$^-$. X$^-$ may of course also be a corresponding fraction of a polyvalent anion, although this is not preferred. Examples of preferred monomers (A1c) of the general formula (Ia) or (Ib) include salts of 3-trimethylammoniopropyl(meth)acrylamides or 2-trimethylammonoethyl (meth)acrylates, for example the corresponding chlorides such as 3-trimethylammoniopropylacrylamide chloride (DIMAPAQUAT) and 2-trimethylammonloethyl methacrylate chloride (MADAME-QUAT).

Amphiphilic Monomers (A2)

The amphiphilic monomers (A2) are monoethylenicaly unsaturated monomers having at least one hydrophilic group and at least one, preferably terminal, hydrophobic group. Monomers of this kind serve to impart hydrophobically associating properties to copolymers comprising (meth)acrylamide.

"Hydrophobically associating copolymers" are understood by the person skilled in the art to mean water-soluble copolymers which, as well as hydrophilic units (in a sufficient amount to assure water solubility), have hydrophobic groups in lateral or terminal positions. In aqueous solution, the hydrophobic groups can associate with one another. Because of this associative interaction, there is an increase in the viscosity of the aqueous polymer solution compared to a polymer of the same kind that merely does not have any associative groups.

Suitable monomers (A2) especially have the general formula $H_2C=C(R^5)-R^6-R^7$ (IIa) where $R^5$ is H or methyl, $R^6$ is a linking hydrophilic group and $R^7$ is a terminal hydrophobic group. In a further embodiment, the monomer (A2) may have general formula $H_2C=C(R^5)-R^6-R^7-R^8$ (IIb) where $R^5$, $R^6$ and $R^7$ are each as defined above, and $R^8$ is a hydrophilic group.

The linking hydrophilic $R^6$ group may be a group comprising alkylene oxide units, for example a group comprising 5 to 50 alkylene oxide units, which is joined to the $H_2C=C(R^5)$ group in a suitable manner, for example by means of a single bond or of a suitable linking group, where at least 70 mol %, preferably at least 90 mol %, of the alkylene oxide units are ethylene oxide units. In addition, the group may be a group comprising quaternary ammonium groups.

In one embodiment of the invention, the hydrophobic $R^7$ group comprises aliphatic and/or aromatic, straight-chain or branched $C_{8-40}$-hydrocarbyl radicals $R^{7a}$, preferably $C_{12-32}$-hydrocarbyl radicals. In a further embodiment, the hydrophobic $R^7$ group may be an $R^{7b}$ group comprising alkylene oxide units having at least 3 carbon atoms, preferably at least 4 carbon atoms.

In one embodiment of the invention, the monomers (A2) are monomers of the general formula $H_2C=C(R^5)-O-(-CH_2-CH(R^8)-O-)_k-R^{7a}$ (IIc) or $H_2C=C(R^5)-(C=O)-O-(-CH-CH(R^8)-O-)_k-R^{7a}$ (IId).

In the formulae (IIc) and (IId), $R^5$ is as defined above, and the $-O-(-CH_2-CH(R^8)-O-)_k-$ and $-(C=O)-O-(-CH_2-CH(R^8)-O-)_k-$ groups are each specific linking $R^6$ groups, meaning that (IIc) is a vinyl ether and (IId) is an acrylic ester.

The number of alkylene oxide units k is a number from 10 to 80, preferably 12 to 60, more preferably 15 to 50 and, for example, 20 to 40. It will be apparent to the person skilled in the art in the field of alkylene oxides that the values stated are mean values.

The $R^8$ radicals are each independently H, methyl or ethyl, preferably H or methyl, with the proviso that at least 70 mol % of the $R^8$ radicals are H. Preferably at least 80 mol % of the $R^8$ radicals are H, more preferably at least 90 mol %, and they are most preferably exclusively H. The block mentioned is thus a polyoxyethylene block which may optionally also have certain proportions of propylene oxide and/or butylene oxide units, preferably a pure polyoxyethylene block.

$R^{7a}$ is an aliphatic and/or aromatic, straight-chain or branched hydrocarbyl radical having 8 to 40 carbon atoms, preferably 12 to 32 carbon atoms. In one embodiment, the aliphatic hydrocarbyl groups have 8 to 22, preferably 12 to 18 carbon atoms. Examples of such groups include n-octyl, n-decyl, n-dodecyl, n-tetradecyl, n-hexadecyl or n-octadecyl groups. In a further embodiment, the groups are aromatic groups, especially substituted phenyl radicals, especially distyrylphenyl groups and/or tristyrylphenyl groups.

In a further embodiment of the invention, the monomers (A2) are monomers of the general formula

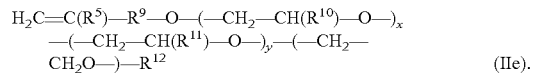

(IIe).

In the monomers (A2) of the formula (IIe), an ethylenic group $H_2C=C(R^5)-$ is bonded via a divalent, linking group $-R^9-O-$ to a polyoxyalkylene radical having block structure, where the $-(-CH_2-CH(R^{10})-O-)_x-$, $-(-CH_2-CH(R^{11})-O-)_y-$ and optionally $-(-CH_2-CH_2O-)_z-R^{12}$ blocks are arranged in the order shown in formula (IIe). The transition between the two blocks may be abrupt or else continuous.

In formula (IIe), $R^5$ is as already defined, i.e. $R^5$ is H or a methyl group.

$R^9$ is a single bond or a divalent linking group selected from the group consisting of $-(C_nH_{2n})-$ [$R^{9a}$ group], $-O-(C_nH_{2n'})-$ [$R^{9b}$ group]- and $-C(O)-O-(C_{n''}H_{2n''})-$ [$R^{9c}$ group]. In the formulae stated, each n is a natural number from 1 to 6, n' and n'' are each a natural number from 2 to 6. In other words, the linking group comprises straight-chain or branched aliphatic hydrocarbyl groups having 1 to 6 hydrocarbon atoms, which are bonded to the ethylenic group $H_2C=C(R^5)-$ directly, via an ether group $-O-$ or via an ester group $-C(O)-O-$. Preferably, the $-(C_nH_{2n})-$, $-(C_nH_{2n'})-$ and $-(C_nH_{2n''})-$ groups are linear aliphatic hydrocarbyl groups.

Preferably, the $R^{9a}$ group is a group selected from $-CH_2-$, $-CH_2-CH_2-$ and $-CH_2-CH_2-CH_2-$, particular preference being given to a methylene group $-CH_2-$.

Preferably, the $R^9$ group is a group selected from $-O-CH_2-CH_2-$, $-O-CH_2-CH_2-CH_2-$ and $-O-CH_2-CH_2-CH_2-CH_2-$, more preferably $-O-CH_2-CH_2-CH_2-CH_2-$.

Preferably, the $R^{9c}$ group is a group selected from $-C(O)-O-CH_2-CH_2-$, $-C(O)O-CH(CH_3)-CH_2-$, $-C(O)O-CH_2-CH(CH_3)-$, $-C(O)O-CH_2CH_2-CH_2-CH_2-$ and $-C(O)OCH-CH-CH_2-CH_2-CH_2-CH_2-$, more preferably $-C(O)-O-CH_2-CH_2-$ and $-C(O)O-CHCH_2-CH_2-CH_2-$ and most preferably $-C(O)-O-CH_2-CH_2-$.

More preferably, the $R^9$ group is an $R^9$ group, most preferably $-O-CH_2-CH_2-CH_2-CH_2-$.

In the $-(-CH_2-CH(R^{10})-O-)_x$ block, the $R^{10}$ radicals are each independently H, methyl or ethyl, preferably H or methyl, with the proviso that at least 70 mol % of the $R^{10}$ radicals are H. Preferably at least 80 mol % of the $R^{10}$ radicals are H, more preferably at least 90 mol %, and they are most preferably exclusively H. The block mentioned is thus a polyoxyethylene block which may optionally have certain proportions of propylene oxide and/or butylene oxide units, preferably a pure polyoxyethylene block.

The number of alkylene oxide units x is a number from 10 to 50, preferably 12 to 40, more preferably 15 to 35, even more preferably 20 to 30 and is, for example, about 22 to 25. It will be apparent to the person skilled in the art in the field of polyalkylene oxides that the numbers stated are mean values of distributions.

In the second —(—$CH_2$—$CH(R^{11})$—O—)$_y$ block, the $R^{11}$ radicals are each independently hydrocarbyl radicals of at least 2 carbon atoms, for example 2 to 10 carbon atoms, preferably 2 or 3 carbon atoms. This radical may be an aliphatic and/or aromatic, linear or branched carbon radical. Preference is given to aliphatic radicals.

Examples of suitable $R^{11}$ radicals include ethyl, n-propyl, n-butyl, n-pentyl, n-hexyl, n-heptyl, n-octyl, n-nonyl or n-decyl, and phenyl. Examples of preferred radicals include ethyl, n-propyl, n-butyl, n-pentyl, and particular preference is given to ethyl and/or n-propyl radicals. The —(—$CH_2$—$CH(R^{11})$—O—)$_y$— block is thus a block consisting of alkylene oxide units having at least 4 carbon atoms.

The number of alkylene oxide units y is a number from 5 to 30, preferably 8 to 25.

In formula (IIe), z is a number from 0 to 5, for example 1 to 4, i.e. the terminal block of ethylene oxide units is thus merely optionally present. In a preferred embodiment of the invention, it is possible to use a mixture of at least two monomers (A2) of the formula (IIe), where the $R^6$, $R^9$, $R^{10}$, $R^{11}$, $R^{12}$ radicals and indices x and y are each the same, but in one of the monomers z=0 while z>0 in the other, preferably 1 to 4.

The $R^{12}$ radical is H or a preferably aliphatic hydrocarbyl radical having 1 to 30 carbon atoms, preferably 1 to 10 and more preferably 1 to 5 carbon atoms. Preferably, $R^{12}$ is H, methyl or ethyl, more preferably H or methyl and most preferably H.

The hydrophobically associating monomers (A2) of the formulae (IIc), (IId) and (IIe), acrylamide copolymers comprising these monomers and the preparation thereof are known in principle to those skilled in the art, for example from WO 2010/133527 and WO 2012/069478.

In a further embodiment, the associative monomer (A2) is a cationic monomer of the general formula $H_2C$=C($R^5$)—C(=O)O—$R^{13}$—$N^+(R^{14})(R^{15})(R^{16})$ $X^-$ (IIf) or $H_2C$=C($R^5$)—C(=O)N($R^{17}$)—$R^{13}$—$N^+(R^{14})(R^{15})(R^{16})$ $X^-$ (IIg).

In the formulae (IIf) and (IIg), $R^5$ is as defined above.

$R^{13}$ is an alkylene radical, especially a 1,ω-alkylene radical having 1 to 8 carbon atoms, preferably 2 to 4 carbon atoms and especially 2 or 3 carbon atoms. Examples include —$CH_2$—, —$CH_2CH_2$—, —$CH_2CH_2CH_2$— and —$CH_2CH_2CH_2CH_2$—. Particular preference is given to —$CH_2CH_2$— and —$CH_2CH_2CH_2$—.

$R^{13}$, $R^{14}$ and $R^{15}$ are each independently H or an alkyl group having 1 to 4 carbon atoms, preferably H or methyl. $R^{13}$ is preferably H, and $R^{14}$ and $R^{15}$ are preferably each methyl. $X^-$ is a negatively charged counterion, especially a halide ion selected from $F^-$, $Cl^-$, $Br^-$ and $I^-$, preferably $Cl^-$ and/or $Br^-$.

$R^{16}$ is an aliphatic and/or aromatic, linear or branched hydrocarbyl group having 8 to 30 carbon atoms, preferably 12 to 18 carbon atoms. $R^{16}$ may especially comprise aliphatic hydrocarbyl radicals having 8 to 18, preferably 12 to 18 carbon atoms. Examples of such groups include n-octyl, n-decyl, n-dodecyl, n-tetradecyl, n-hexadecyl or n-octadecyl groups, preference being given to n-dodecyl, n-tetradecyl, n-hexadecyl or n-octadecyl groups.

Preference is given to a monomer of the general formula (IIg). Examples of such monomers include N-(meth)acrylamidopropyl-N,N-dimethyl-N-dodecylammonlum chloride, N-(meth)acrylamidopropyl-N,N-dimethyI-N-tetradecylammonium chloride, N-(meth)acrylamklopropyl-N,N-dimethyl-N-hexadecylammonium chloride or N-(meth)acrylamkidopropyl-N,N-dimethyl-N-octadecylammonium chloride or the corresponding bromides. Monomers of this kind, and acrylamide copolymers having monomers of this kind, are known and described, for example, in U.S. Pat. No. 7,700,702 B2.

Further Monomers (A3)

As well as the hydrophilic monomers (A1) and/or associative monomers (A2), acrylamide copolymers may optionally comprise ethylenically unsaturated monomers other than the monomers (A1) and (A2), preferably monoethylenically unsaturated monomers (A3). It is of course also possible to use mixtures of various monomers (A3). Monomers of this kind can be used for fine control of the properties of acrylamide copolymers.

The monomers (A3) may, for example, be monoethylenically unsaturated monomers which have a more hydrophobic character than the hydrophilic monomers (A1) and which are correspondingly water-soluble only to a small degree. In general, the solubility of the monomers (A3) in water at room temperature is less than 50 g/l, especially less than 30 g/l. Examples of monomers of this kind include N-alkyl- and N,N'-dialkyl(meth)acrylamides, where the number of carbon atoms in the alkyl radicals together is at least 3, preferably at least 4. Examples of monomers of this kind include N-butyl(meth)acrylamide, N-cyclohexyl(meth)acrylamide and N-benzyl(meth)acrylamide.

In addition, monomers (A3) may also be ethylenically unsaturated monomers having more than one ethylenic group. Monomers of this kind can be used in special cases in order to achieve easy crosslinking of the acrylamide polymers. The amount thereof should generally not exceed 2% by weight, preferably 1% by weight and especially 0.5% by weight, based on the sum total of all the monomers. More preferably, the monomers (A3) are exclusively monoethylenicaly unsaturated monomers.

Acrylamide Polymers (P)

One embodiment of the invention involves a homopolymer of methacrylamide or of acrylamide, preferably a homopolymer of acrylamide. The term "homopolymer" shall also include copolymers of acrylamide and methacrylamide (Meth)acrylamide copolymers comprise, as well as (meth)acrylamide, preferably acrylamide, at least one further, monoethylenically unsaturated monomer other than (meth)acrylamide. This is at least one monomer selected from the group of non-(meth)acrylamide hydrophilic monomers (A1), amphiphilic monomers (A2) or further monomers (A3). Preferred (meth)acrylamide copolymers comprise, as well as (meth)acrylamide, at least one further, different hydrophilic monomer (A1). Other preferred (meth)acrylamide copolymers comprise, as well as (meth)acrylamide, at least one further, different hydrophilic monomer (A1) and at least one hydrophilic monomer (A2).

The amount of all the hydrophilic monomers (A1) together, i.e. Including (meth)acrylamide, is at least 70% by weight based on the amount of all the monomers, preferably at least 80% by weight and more preferably at least 90% by weight.

In (meth)acrylamide copolymers, generally at least 20% by weight, especially at least 30% by weight, preferably at least 50% by weight, more preferably at least 60% by weight and, for example, at least 70% by weight of the monoethylenically unsaturated monomers (A) are (meth)acrylamide, where the stated amount is based on the sum total of all the monomers.

If present, the amount of amphiphilic monomers (A2) may be up to 15% by weight, based on the total amount of all the monomers in acrylamide copolymers, for example 0.1 to 15% by weight, especially 0.2 to 10% by weight, preferably 0.5 to 5% by weight and, for example, 0.5 to 2% by weight.

If they are present at all, the amount of optionally present monomers (A3) may be up to 15% by weight, preferably up to 10% by weight, more preferably up to 5% by weight, based in each case on the total amount of all the monomers. An upper limit for ethylenically unsaturated monomers having more than one ethylenic group has already been given. Most preferably, no monomers (A3) are present.

Apart from the monomers (A1), (A2) and (A3), it is generally the case that no further monomers are present, i.e. the sum total of the monomers (A1), (A2) and (A3) is generally 100%.

In one embodiment of the invention, the copolymer is a copolymer comprising 85% by weight to 99.9% by weight of hydrophilic monomers (A1) including at least (meth) acrylamide, preferably 90% by weight to 99.8% by weight, more preferably 95% by weight to 99.5, and 0.1% by weight to 15% by weight of amphiphilic monomers (A2), preferably 0.2% by weight to 10% by weight, more preferably 0.5% by weight to 5% by weight, where the sum of all the monomers (A1) and (A2) is 100% by weight.

In a preferred embodiment, the (meth)acrylamide polymer is a copolymer comprising (meth)acrylamide and at least one anionic, monoethylenically unsaturated, hydrophilic monomer (A1b). More particularly, the monomer (A1b) is a monomer comprising at least one acidic group selected from the group of —COOH, —SO$_3$H or —PO$_3$H$_2$ or salts thereof, preferably —COOH and/or —SO$_3$H or salts thereof.

In a preferred embodiment, the acrylamide polymer P is a copolymer comprising (meth)acrylamide and acrylic acid or salts thereof. This may especially be a copolymer comprising 60 to 80% by weight of (meth)acrylamide and 20 to 40% by weight of acrylic acid. Optionally, the copolymer may comprise at least one amphiphilic copolymer (A2) in an amount of up to 15% by weight, preferably 0.2 to 10% by weight. More preferably, this is an amphiphilic monomer of the general formula (IIe) H$_2$C=C(R$^5$)—R$^9$—O—(—CH$_2$—CH(R$^{10}$)—O—)$_x$—(—CH$_2$—CH(R$^{11}$)—O—)$_y$—(—CH$_2$—CH$_2$O—)$_z$—R$^{12}$. The radicals and indices and the preferred ranges thereof have already been defined above.

In a further preferred embodiment, the acrylamide polymer P is a copolymer comprising (meth)acrylamide and ATBS (2-acrylamido-2-methylpropane-1-sulfonic acid, H$_2$C=CH—CO—NH—C(CH$_3$)$_2$—CH$_2$—SO$_3$H or salts thereof. This may especially be a copolymer comprising 60 to 80% by weight of (meth)acrylamide and 40 to 60% by weight of AMPS. Optionally, the copolymer may comprise at least one amphiphilic comonomer (A2) in an amount of up to 15% by weight, preferably 0.2 to 10% by weight. More preferably, this is an amphiphilic monomer of the general formula (IIe) H$_2$C=C(R$^5$)—R$^9$—O—(—CH$_2$—CH(R$^{10}$)—O—)$_x$—(—CH$_2$—CH(R$^{11}$)—O—)$_y$—(—CH$_2$—CH$_2$O—)$_z$—R$^{12}$. The radicals and indices and the preferred ranges thereof have already been defined above.

In a further preferred embodiment, the (meth)acrylamlde polymer is a copolymer comprising (meth)acrylamide and at least two anionic, monoethylenically unsaturated, hydrophilic monomers (A1 b).

More particularly, the monomers (A1b) are monomers comprising at least one acidic group selected from the group of —COOH, —SO$_3$H or —PO$_3$H$_2$ or salts thereof, preferably —COOH and/or —SO$_3$H or salts thereof. An acrylamide polymer of this kind is preferably a copolymer comprising (meth)acrylamide, 2-acrylamido-2-methylpropanesulfonic acid (AMPS) and acrylic acid. This may especially be a copolymer comprising 40 to 60% by weight of (meth)acrylamide and 20 to 30% by weight of acrylic acid and 20 to 30% by weight of AMPS. Optionally, the copolymer may comprise at least one amphiphilic comonomer (A2) in an amount of up to 15% by weight, preferably 0.2 to 10% by weight. More preferably, this is an amphiphilic monomer of the general formula (IIe) H$_2$C=C(R$^5$)—R$^9$—O—(—CH$_2$—CH(R$^{10}$)—O—)$_x$—(—CH$_2$—CH(R$^{11}$)—O—)$_y$—(—CH$_2$—CH$_2$O—)$_z$—R$^{12}$. The radicals and indices and the preferred ranges thereof have already been defined.

In a further preferred embodiment, the (meth)acrylamide polymer is a copolymer comprising (meth)acrylamide and at least one cationic, monoethylenically unsaturated, hydrophilic monomer (A1c). The monomers (A1c) may especially be monomers H$_2$C=C(R$^1$)—CO—NR$^2$—R$^3$—N(R$^4$)$_3^+$ X$^-$ (Ia) and/or H$_2$C=C(R$^1$)—COO—R$^3$—N(R$^4$)$_3^+$ X$^-$ (Ib). The radicals and indices and the preferred ranges thereof have already been defined above. This may especially be a copolymer comprising 60 to 80% by weight of (meth) acrylamide and 20 to 40% by weight of cationic monomers (A1c). Optionally, the copolymer may comprise at least one amphiphilic comonomer (A2) in an amount of up to 15% by weight, preferably 0.2 to 10% by weight.

In a further preferred embodiment, the (meth)acrylamide polymer is a copolymer comprising (meth)acrylamide, at least one anionic, monoethylenically unsaturated, hydrophilic monomer (A1b) and at least one amphiphilic monomer (A2) of the general formula H$_2$C=C(R$^5$)—C(=O)O—R$^{13}$—N$^+$(R$^{14}$)(R$^{15}$)(R$^{16}$) X$^-$ (IIf) or H$_2$C=C(R$^5$)—C(=O)N(R$^{17}$)—R$^{13}$—N(R$^{14}$)(R$^{15}$)(R$^{16}$) X$^-$, (IIg). It is preferably a monomer of the general formula (IIg). The radicals and indices and the preferred ranges thereof have already been defined above. This may especially be a copolymer comprising 60 to 80% by weight of (meth)acrylamide and 10 to 40% by weight of anionic monomers (A1b) and 0.1 to 10% by weight of said monomer (A2) of the formula (IIf) and/or (IIg), preferably (IIg).

In a preferred embodiment, the (meth)acrylamide-comprising homo- or copolymer to be preferred in accordance with the invention has a weight-average molecular weight M$_W$ of at least 1*10$^6$ g/mol, especially from 1*10$^6$ g/mol to 30*10$^6$ g/mol, preferably 5*10$^6$ g/mol to 30*10$^6$ g/mol, for example 5 to 25*10$^6$ g/mol, for example about 20*10$^6$ g/mol.

Process of the Invention

Process Step (I)

In process step (I), an aqueous solution is provided for the polymerization, comprising at least water, the monomers (A) to be used, at least one stabilizer (B) for prevention of polymer degradation and at least one azo initiator (C).

As well as the water solvent, it is optionally possible to use small amounts of water-miscible organic solvents, in which case the proportion of water is generally at least 85% by weight and preferably at least 95% by weight and more preferably at least 98% by weight, based in each case on the sum of all the solvents together. In a particularly preferred embodiment of the invention, exclusively water is used as solvent.

Monomers (A)

The aqueous monomer solution comprises 25 to 45% by weight, preferably 30% by weight to 40% by weight, of ethylenically unsaturated monomers (A), where the stated amount is based on the amount of all the components of the aqueous solution. According to the invention, at least 70% by weight of the monomers are monoethylenically unsaturated, hydrophilic monomers (A1), with the proviso that at least one of the monomers (A1) is (meth)acrylamide. Suitable monomer compositions and ratios, including preferred compositions and ratios, have already been described in detail above. Reference is made explicitly to this description at this point.

Stabilizers (B)

The aqueous solution of the monomers further comprises 0.1 to 2% by weight—based on the sum total of all the monomers—of at least one stabilizer (B) for prevention of polymer degradation by molecular oxygen.

The stabilizers (B) for prevention of polymer degradation are what are called "free-radical scavengers", i.e. compounds which can react with free radicals (for example oxygen, free radicals formed by UV light or other redox processes), such that said radicals can no longer attack and hence degrade the polymer. Stabilizers of this kind are known in principle to those skilled in the art.

However, the reactivity thereof with respect to the free radicals which occur in the free-radical polymerization must not be so great that they significantly influence the polymerization. Suitable stabilizers therefore have only low reactivity under the conditions of the polymerization or are inert with respect to the free radicals which occur in the course of polymerization.

In a preferred embodiment of the invention, stabilizers are those selected from the group of sulfur compounds, sterically hindered amines, N-oxides, nitroso compounds, aromatic hydroxyl compounds or ketones.

Examples of sulfur compounds include thiourea, substituted thioureas such as N,N'-dimethylthiourea, N,N'-diethylthiourea, N,N'-diphenylthiourea, thiocyanates, for example ammonium thiocyanate or potassium thiocyanate, tetramethylthiuram disulfide, and mercaptans such as 2-mercaptobenzothiazole or 2-mercaptobenzimidazole or salts thereof, for example the sodium salts, sodium dimethyldithiocarbamate, 2,2'-dthiobis(benzothiazole), 4,4'-thiobis(6-t-butyl-m-cresol).

Further examples include dicyandiamide, guanidine, cyanamide, paramethoxyphenol, 2,6-di-t-butyl-4-methylphenol, butylhydroxyanisole, 8-hydroxyquinoline, 2,5-di(t-amyl)-hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine, 4-hydroxy-2,2,6,6-tetramethyoxylpiperidine, (N-(1,3-dimethylbutyl)-N'-phenyl-p-phenylenedlamine and 1,2,2,6,6-pentamethyl-4-piperidinol.

Preference is given to sterically hindered amines such as 1,2,2,6,6-pentamethyl-4-piperidinol and sulfur compounds, preferably mercapto compounds, especially 2-mercaptobenzothiazole or 2-mercaptobenzimidazole or the respective salts thereof, for example the sodium salts, and particular preference is given to 2-mercaptobenzothiazole or salts thereof, for example the sodium salts.

Azo Initiators (C)

According to the invention, the aqueous solution further comprises at least one azo initiator (C) having a 10 h $t_{1/2}$ in water of 40° C. to 75° C., preferably 50° C. to 75° C. The 10-hour half-life temperature of azo initiators is a parameter known to those skilled in the art which describes the behavior of initiators. The values describe the temperature at which, after 10 h in each case, half of the amount of initiator originally present has broken down. Corresponding values can be taken, for example, from the data sheets for azo initiators. On the basis of the 10 h $t_{1/2}$ of 40° C. to 75° C., the initiators do not decompose, or at least do not do so at a significant rate, at room temperature. The values are based on a solution in water.

The azo initiators are preferably fully water-soluble, but it is sufficient that they are soluble in the monomer solution in the desired amount. AIBN (azobis(isobutyronitrile)), for example, is barely water-soluble, but is soluble in the aqueous solution comprising 25 to 45% by weight of monomers.

Examples of suitable azo initiators include 2,2'-azobis[2-(2-imidazolin-2-yl)propane]dihydrochloride (10 h $t_{1/2}$ (water): 44° C.), 2,2-azobis(2-methylpropionamidine) dihydrochloride (10 h $t_{1/2}$ (water): 56° C.), 2,2'-azobis(N-(2-carboxyethyl)-2-methylpropionamidine hydrate (10 h $t_{1/2}$ (water): 57° C.), 2,2'-azobis{2-[1-(2-hydroxyethyl)-2-imidazolin-2-yl]propene} dihydrochloride (10 h $t_{1/2}$ (water): 60° C.), 2,2'-azobis(1-imino-1-pyrrolidino-2-ethylpropane) dihydrochloride (10 h $t_{1/2}$ (water): 67° C.) or azobis(isobutyronitrile) (10 h $t_{1/2}$ (toluene): 67° C.).

The pH of the aqueous monomer solution is adjusted to a pH<7, for example 3 to 6.9, especially 5 to 6.9, preferably 5 to 6.5, more preferably 5.5 to 6.5 and, for example, about 6. This is effected—according to the nature and amount of the monomers used—with acids or bases.

In addition, the monomer solution is cooled to a temperature of less than 5° C., preferably −4° C. to +4° C., more preferably −4° C. to 0° C. The monomer solution is kept at a temperature of less than 5° C. until commencement of the polymerization.

In a further component step, the monomer solution is inertized, meaning that any oxygen still present in the monomer solution is removed. This can be effected, for example, in a manner known in principle, by bubbling an inert gas, for example nitrogen or argon, through the solution. This can alternatively be effected using appropriate apparatuses, for example the apparatus described in WO 03/066190 A1.

The aqueous solution is prepared by mixing the components with water and optionally further, water-miscible solvents. The aqueous solution can be prepared in the reactor intended for polymerization. However, it can preferably be prepared in separate apparatuses, such that the polymerization reactor is finally filled with the prepared solution.

The monomers and the further components can be mixed, for example, in a mixing tank which is cooled in a suitable manner, for example by means of circulation cooling. The azo initiators (C) can be added before the cooling, preferably during or after the cooling. The inertization preferably follows the cooling, but there is no intention to restrict the invention thereto. The inertization can be effected by freeing the mixture of oxygen in said mixing tank or a separate apparatus, for example by passing an inert gas through the solution.

Further Components

The aqueous monomer solution used for polymerization may of course also comprise further additives and auxiliaries for the polymerization, for example defoamers or complexing agents.

If the copolymers are (meth)acrylamide copolymers comprising amphiphilic monomers (A2), the copolymers, in a preferred embodiment of the invention, can be prepared in the presence of at least one non-polymerizable, surface-active compound (T).

The non-polymerizable, surface-active compound (T) is preferably at least one nonionic surfactant, although anionic and cationic surfactants are also suitable, provided that they do not take part in the polymerization reaction.

These compounds may especially be surfactants, preferably nonionic surfactants of the general formula $R^{18}$—Y where $R^{18}$ is a hydrocarbyl radical having 8 to 32, preferably 10 to 20 and more preferably 12 to 18 carbon atoms and Y is a hydrophilic group, preferably a nonionic hydrophilic group, especially a polyalkoxy group.

The nonionic surfactant is preferably an ethoxylated long-chain aliphatic alcohol which may optionally comprise aromatic components.

Examples include: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates. Especially useful compounds have been found to be those having 5 to 20 ethyleneoxy units, preferably 8 to 18 ethyleneoxy units. Optionally, it is also possible for small amounts of higher alkyleneoxy units to be present, especially propyleneoxy and/or butyleneoxy units, although the amount as ethyleneoxy units should generally be at least 80 mol % based on all the alkyleneoxy units.

Especially suitable are surfactants selected from the group of ethoxylated alkylphenols, ethoxylated saturated iso-C13 alcohols and/or ethoxylated C10 Guerbet alcohols, where 5 to 20 ethyleneoxy units, preferably 8 to 18 ethyleneoxy units, are present in each of the alkyleneoxy radicals.

The addition of non-polymerizable, interface-active compounds (T) during the polymerization leads to a distinct improvement in performance properties of the (meth)acrylamide copolymers, which is beneficial particularly in oilfield applications such as tertiary mineral oil production (enhanced oil recovery, EOR). More particularly, the thickening effect is enhanced, and the gel content of the copolymer is also reduced. This effect can probably be explained as follows, but without any intention thus to tie the invention to this explanation.

In the case of polymerization without the presence of a surfactant, the amphiphilic monomers (A2) form micelles in the aqueous reaction medium. The effect of this in the polymerization is that the amphiphilic monomers (A2) are not incorporated uniformly into the polymer; instead, the copolymer has region with a higher density of the amphiphilic monomers. If an additional surface-active compound is present in the course of preparation of the copolymers, mixed micelles form with the amphiphilic monomers. These mixed micelles comprise polymerizable and non-polymerizable components. As a result, the amphiphilic monomers (A2) are distributed more uniformly over the polymer chain. Thus, the structure of the copolymers prepared in the presence of a surfactant differs from those without the presence of a surfactant.

The non-polymerizable, interface-active compounds (T) can generally be used in an amount of 0.1 to 5% by weight based on the amount of all the monomers used. The weight ratio of the non-polymerizable, interface-active compounds (T) used relative to the amphiphilic monomers (A2) is generally 4:1 to 1:4, preferably 2:1 to 1:2, more preferably 1.5:1 to 1:1.5 and, for example, about 1:1.

Process Step (II)

After the aqueous monomer solution has been provided in process step (I), at least one redox initiator (D) is added to the cooled and inertized monomer solution. Redox initiators can initiate a free-radical polymerization even at temperatures of less than 5° C.

Redox initiators for free-radical polymerization are known in principle to those skilled in the art. Examples of redox initiators (D) include systems based on $Fe^{2+}/Fe^{3+}$—$H_2O_2$, $Fe^{2+}/Fe^{3+}$-alkyl hydroperoxides, alkyl hydroperoxides-sulfite, for example t-butyl hydroperoxide-sodium sulfite, peroxides-thiosulfate or alkyl hydroperoxides-sulfinates, for example alkyl hydroperoxides/hydroxymethanesulfinates, for example t-butyl hydroperoxide-sodium hydroxymethanesulfinate.

The redox initiators (D) are not added until immediately before the polymerization. Preference is given to using a solution, for example an aqueous solution, of the redox initiators (D). They can be metered in, for example, during or after the charging of the polymerization reactor. Advantageously, the redox initiators (D) can be metered into the monomer feed of the polymerization reactor during the charging of the reactor. In order to assure rapid mixing of the redox initiators, the monomer feed can advantageously be equipped with a static mixer.

Process Step (III)

In process step (III), the aqueous monomer solution is polymerized to obtain a solid polymer gel. If this has not already been done in the course of step (I) or (II), the aqueous monomer solution prepared is introduced into a suitable reactor for polymerization. The reactor and—if this has not already been done—the monomer solution are inertized before the polymerization.

The gel polymerization is generally effected without stirring. It can be undertaken, for example, in a tube reactor as described by GB 1,054,028.

According to the invention, the polymerization of the aqueous monomer solution is conducted under adiabatic conditions. "Adiabatic" is understood by the person skilled in the art to mean that there is no exchange of heat with the environment. This ideal is naturally difficult to achieve in practical chemical engineering. In the context of this invention, "adiabatic" shall consequently be understood to mean "essentially adiabatic", meaning that the reactor is not supplied with any heat from the outside during the polymerization, i.e. is not heated, and the reactor is not cooled during the polymerization. However, it will be clear to the person skilled in the art that—according to the internal temperature of the reactor and the ambient temperature—certain amounts of heat can be released or absorbed via the reactor wall because of temperature gradients, but this effect naturally plays an ever lesser role with increasing reactor size.

The initiation temperature of the polymerization is less than 5° C., preferably −4° C. to +4° C., more preferably −4° C. to 0° C. The polymerization starts even at such low temperatures because of the redox initiators (D) added. The heat of polymerization released heats up the mixture. On attainment of a sufficient temperature, the azo initiator (C) also begins to break down and likewise initiates the polymerization. Under the influence of the heat of polymerization evolved, the mixture heats up to a temperature of 60° C. to 100° C.

After the polymerization, the polymer gel formed can be withdrawn from the reactor. This can be effected by means of mechanical auxiliaries, for example with the aid of a ram in the case of a tubular reactor. In addition, the reactor may have outlet valves arranged at the base, and the polymer can be expressed from the reactor with the aid of gases such as compressed air or nitrogen.

Particularly advantageously, the polymerization can be conducted using conical reactors, as described, for example, by U.S. Pat. No. 5,633,329 or U.S. Pat. No. 7,619,046 B2.

FIG. 1 shows a conical reactor which can be used for performance of the gel polymerization. This is a vertical tubular reactor (1) which has a diameter D1 and narrows conically (2) at the lower end, where the diameter at the end of the conical narrowing is D2. The ratio D1/D2 is generally 2:1 to 25:1, preferably 2:1 to 20:1 and, for example, 3:1 to 10:1. The angle α between the wall in the cylindrical section (1) and the wall in the region of the conical narrowing (2) is more than 120° and less than 180°, especially 135° to 175°, preferably 150° to 175° and, for example, 155° to 170°. The ratio of height to diameter D1 of the cylindrical section (1) of the reactor may be 4 to 40. The capacity of the reactors is chosen by the person skilled in the art according to the desired production capacity and may be 1 to 100 m$^3$, for example 5 to 50 m$^3$, without any intention that the invention be restricted thereto.

The inner surface of the reactor has preferably been provided with a coating to reduce the adhesion of the reaction mixture to the reactor wall, for example with a Teflon coating.

At the lower end, the reactor has a shut-off device (3). The reactor further comprises at least one feed (4). Through this feed (4), the aqueous monomer solution and/or gases and/or further components can be passed into the reactor. Gases may especially be inert gases such as nitrogen, argon or $CO_2$. Inert gases can be used to purge the reactor for inertization. Of course, it is also possible for different feeds to be present for different components, for example separate feeds for the aqueous reaction solution and gases. The at least one feed (4) may preferably be mounted at the top of the reactor or at the side in the upper region of the reactor, but other arrangements are of course also possible.

The reactor may of course comprise further components, for example further feeds, for example for compressed air or solvents, or discharge apparatuses for the gel, for example movable rams arranged within the reactor, as described, for example, by GB 1,054,028.

FIG. 2 shows a fully conical reactor. It is of similar construction to the partly conical reactor just outlined, but does not have any cylindrical section, the diameter being d1 at the upper end of the conical reactor and d2 at the lower end. The ratio d1/d2 is generally 1.1:1 to 25:1, especially 2:1 to 25:1, preferably 2.1 to 10:1 and, for example, 3.1 to 10:1. The angle β between the upper diameter d1 and the reactor wall is more than 45° and less than 90°, preferably 60° to 89°, for example 70° to 88°. For the rest, reference is made to the above description.

To conduct the polymerization, the cooled monomer solution is transferred through the feed (4) or another feed into the fully or partly conical reactor. The reactor should be purged with an inert gas, for example nitrogen, argon or carbon dioxide, before and/or during the filling.

The polymerization proceeds as already described above.

To withdraw the polymer gel from the reactor after the polymerization has ended, the shut-off device (3) is opened. In general, the polymer gel obtained is solid and does not flow out of the reactor without additional measures. If the reactor used has mechanical aids, for example a movable ram arranged within the reactor, as described by GB 1,054,028, the polymer gel can be expressed using such aids.

The expression of the polymer gel from the fully or partly conical reactor described above can preferably be undertaken using gases or liquids. For this purpose, a gas is injected at the top of the tubular reactor via the feed (4) or another feed. For this purpose, it is possible to use any gases which cannot react with the polymer gel. Advantageously, it is possible for this purpose to inject inert gases such as nitrogen, carbon dioxide or argon via the feed (4), because this feed is already present. It is also possible to use other gases, for example compressed air.

Alternatively, it is also possible to inject an inert liquid, especially a precipitant for the polymer, at the top of the reactor. The pressure of the gas or the liquid is selected suitably by the person skilled in the art and may, for example, be $2*10^5$ to $65*10$ Pa, especially $4*10^5$ to $25*10^5$ Pa. More particularly, it is selected such that the polymer gel is discharged homogeneously from the reactor.

Process Step (IV)

The polymer gel obtained is dried in a further process step. The drying is preferably preceded by comminution of the polymer gel. The drying should preferably be effected at temperatures below 100° C. To avoid sticking, a suitable separating agent can be used for this step. The water-soluble (meth)acrylamlde homo- or copolymer is obtained in the form of granules or powder.

Further Process Steps

The process of the invention may of course also comprise further process steps.

Since the polymer powder or granules obtained is/are generally used in the form of an aqueous solution in the course of the employment at the site of use, the polymer has to be dissolved in water on site. This can cause unwanted formation of lumps with the high molecular weight polymers described.

In order to avoid this, as early as in the course of synthesis, it is possible to add an auxiliary which accelerates or improves the dissolution of the dried polymer in water to the inventive polymers. This auxiliary may, for example, be urea.

Further Embodiments of the Process

In a further embodiment of the process, rather than two different thermal polymerization initiators (C) and (D), a combination of at least one azo initiator (C) and at least one photoinitiator (E) is used.

Accordingly, a process for preparing water-soluble homo- or copolymers comprising (meth)acrylamide by free-radical polymerization has also been found, wherein an aqueous solution of ethylenically unsaturated monomers comprising at least (meth)acrylamide in the presence of at least one stabilizer for prevention of polymer degradation by molecular oxygen, wherein the polymerization is a gel polymerization, and wherein the process comprises at least the following steps:

(Ia) providing an aqueous monomer solution comprising at least
water,
25 to 45% by weight—based on the amount of all the components of the aqueous solution—of ethylenically unsaturated monomers (A), where at least 70% by weight of the monomers are monoethylenically unsaturated, hydrophilic monomers (A1), with the proviso that at least one of the monomers (A1) is (meth)acrylamide,
0.1 to 2% by weight—based on the sum total of all the monomers—of at least one stabilizer (B) for prevention of polymer degradation by molecular oxygen,
at least one azo initiator (C) having a 10 h $t_{1/2}$ of 40° C. to 75° C.,
at least one photoinitiator (E), where the aqueous monomer solution
has a pH of <7,
has been cooled to a temperature of <5° C. and
has been inertized,
(IIIa) polymerizing the aqueous monomer solution under essentially adiabatic conditions, the initiation temperature of the polymerization being less than 5° C. and the polymerization being triggered by irradiation of the monomer solution with UV radiation, and the mixture being heated under the influence of the heat of polymerization which develops to a temperature of 60° C. to 100° C., forming a polymer gel, and
(IV) drying the polymer gel obtained.

In a preferred embodiment, the stabilizers are at least one stabilizer selected from the group of sulfur compounds, sterically hindered amines, N-oxides, nitroso compounds, aromatic hydroxyl compounds and ketones.

Process step (Ia) is performed in the same way as the process step (I) already described, including the preferred embodiments described, with the sole difference that the monomer solution additionally comprises at least one photoinitiator (E) which can trigger a free-radical polymerization by irradiation with UV light. Examples of suitable photoinitiators include 2,2-dimethoxy-1,2-diphenylethan-1-one or 1-[4-(2-hydroxyethoxy)phenyl]-2-hydroxy-2-methyl-1-propan-1-one. The photoinitiator can be added before, during or after the cooling of the monomer solution to less than 5° C.

The polymerization in process step (IIIa) is initiated at temperatures of less than 5° C., by irradiating the monomer solution in the reactor with UV radiation. For this purpose, suitable UV sources can be incorporated, for example, into the reactor wall or inserted into the reactor. As in the case of initiation with redox initiators, the onset of the polymerization releases heat, such that, after the rise in temperature, the azo initiator (C) ultimately also begins to break down.

The abovementioned process step (II) is naturally dispensed with. For the rest, we refer to the details given above.

The examples which follow are intended to illustrate the invention in detail:

Methods Used:
Determination of Gel Content:
0.1 g of the polymer was dissolved in 1 l of tap water at 25° C. (concentration: 1000 ppm). The solution was filtered through a 315 μm sieve and the amount of polymer gel remaining on the sieve was determined.

Determination of MPFR (Millipore Filtration Ratio)
The filterability of the polymer solutions was examined with the aid of the MPFR value (Millipore filtration ratio). The MPFR value (Millipore filtration ratio) states the deviation of a polymer solution from ideal filtration characteristics, with no reduction in the filtration rate as a result of the blockage of the filter in the case of ideal filtration characteristics.

To determine the MPFR values, about 200 ml of polymer solution having a concentration of 1000 ppm were filtered through a polycarbonate filter have a pore size of 5 μm at a pressure of $1.38*10^5$ Pa. In the course of this, the amount of filtrate was recorded as a function of time. The MPFR value was calculated by the following formula:

$$MPFR=(t_{180g}-t_{160g})/(t_{80g}-t_{60g}),$$

with $t_{index}$=time at which the amount of filtrate specified was measured, i.e. $t_{180\,g}$ is the time at which 180 g of filtrate were measured. According to API RP 63 ("Recommended Practices for Evaluation of Polymers Used in Enhanced Oil Recovery Operations", American Petroleum Institute), values of less than 1.3 are acceptable.

Determination of Viscosity:
The viscosity was determined in each case at a polymer concentration of 1000 ppm in tapwater at 25° C. or 60° C. in synthetic seawater with a Brookfield LVDV-II viscometer with a UL adapter. A rotation speed of 6 rpm was used.

Long-Term Storage
Aqueous solutions of the polymers to be tested (concentration 1000 ppm) were made up using tap water. Subsequently, the solution was transferred to a test tube, which was sealed by fusion. The samples were stored in an oven at 80° C. for up to 120 days. After the test had ended, the viscosity was determined in each case.

Preparation of an Amphiphilic Monomer (A2)

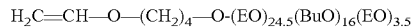

$$H_2C=CH-O-(CH_2)_4-O-(EO)_{24.5}(BuO)_{16}(EO)_{3.5}$$

ABBREVIATIONS

HBVE hydroxybutyl vinyl ether, $H_2C=CH-O-(CH_2)_4-OH$
EO ethylene oxide
BuO butylene oxide (>85% by weight of 1,2-butylene oxide)
Method: alkoxylation of HBVE with 24.5 EO, followed by 16 BuO, followed by 3.5 EO Preparation Method:
A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with $N_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the initiation), and the vessel was left for 30 min and decompressed to 1.3 bar absolute.

Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under $N_2$. The analysis (OH number, GPC, 1H NMR in $CDCl_3$, 1H NMR in MeOD) confirmed the structure HBVE-22 EO.

A 2 l pressure autoclave with an anchor stirrer was initially charged with 588.6 g (0.543 mol) of HBVE-22 EO, and the stirrer was switched on. Thereafter, 2.39 g of 50% NaOH solution (0.030 mol of NaOH, 1.19 g of NaOH) were added, a vacuum of <10 mbar was applied, and the mixture was heated to 100° C. and kept there for 80 min in order to distill off the water. The vessel was purged three times with $N_2$. Thereafter, the vessel was tested for leaks, the pressure was set to 0.5 bar gauge (1.5 bar absolute), the vessel was heated to 127° C. and then the pressure was adjusted to 1.6 bar absolute. 59.7 g (1.358 mol) of EO were metered in at 127° C.; $p_{max}$ was 3.9 bar absolute. Establishment of constant pressure was awaited, which took 30 min, then the vessel was decompressed to 1.0 bar absolute. 625.5 g (8.688 mol) of BuO (butylene oxide) were metered in at 127° C.; $p_{max}$ was 3.1 bar absolute. An intermediate decompression was conducted because of an increase in fill level. The metered addition of BuO was stopped, the mixture was left to react for 1 h until the pressure was constant, and the vessel was decompressed to 1.0 bar absolute. Thereafter, the metered addition of BuO was continued. $P_{max}$ was still 3.1 bar (first decompression after 610 g of BuO, total metering time for BuO 8 h including break for decompression). After the metered addition of BuO had ended, the mixture was left to react for a further 8 h and then heated up to 135° C. The vessel was decompressed to 1.6 bar absolute. Thereafter, 83.6 g (1.901 mol) of EO (ethylene oxide) were metered in at 135° C.; $p_{max}$ was 3.1 bar absolute. After the metered addition of EO had ended, the mixture was left to react for a further 4 h. The mixture was cooled to 100° C., and residual oxide was drawn off until the pressure was below 10 mbar for at least 10 min. Then 0.5% water was added at 120° C. and then drawn off until the pressure was below 10 mbar for at least 10 min. The vacuum was broken with $N_2$, and 100 ppm of BHT were added. The dispensing was effected at 80° C. under $N_2$. The analysis (mass spectrum, GPC, 1H NMR in $CDCl_3$, 1H NMR in MeOD) confirmed the mean composition HBVE-24.5 EO-16 BuO-3.5 EO.

EXAMPLE 1

Preparation of a Copolymer of 67% by Weight of Acrylamide and 33% by Weight of Sodium Acrylate Free-radical oxygen scavenger: sodium 2-mercaptobenzothlazole (0.35% by weight based on monomers)
Initiation at: 0° C.
pH 6.5
Monomer concentration: 30% by weight The following were added to a plastic bucket with magnetic stirrer, pH meter and thermometer 112.8 g of a 35% aqueous solution of sodium acrylate, and then successively 108.3 g of distilled water, 164.0 g of acrylamide (49.1% aqueous solution), 1.2 g of diethylenetriaminepentaacetic acid, pentasodium salt (as 5% aqueous solution), 0.42 g of sodium 2-mercaptobenzothiazole and 4 ml of a 4% aqueous solution of 4,4'-azobis(4-cyanovaleric acid) (10 h $t_{1/2}$ in water: 69° C.). After the solution had been adjusted to pH 6.5 with a 20% or 2% sulfuric acid solution, a monomer concentration of 30% by weight of monomers, based on the sum total of all the components of the monomer solution, was set by means of further addition of water, and the monomer solution was cooled to −2° C.

The cooled monomer solution was transferred to a thermos flask, the temperature sensor for temperature recording was attached and the solution was purged with nitrogen for 30 minutes. The temperature toward the end of the purging was 0° C. Thereafter, 1 ml of a 4% AIBN solution in methanol (10 h $t_{1/2}$ of AIBN in toluene: 67° C.), 0.1 ml of a 1% aqueous solution of t-butyl hydroperoxide and 0.2 ml of a 1% aqueous sodium sulfite solution were added and mixed in. After the polymerization had set in, the temperature rose from 0° C. to 80 to 90° C. within 25 min. A solid polymer gel was obtained. After the temperature maximum had been attained, the gel was kept at 80° C. in a drying cabinet for another 2 h.

After the polymerization had ended, the gel block was comminuted with the aid of a meat grinder and the gel granules obtained were dried in a fluidized bed dryer at 55° C. for two hours. A white, hard granular material was obtained, which was converted to a pulverulent state by means of a centrifugal mill. The results are summarized in table 1.

In addition, a long-term storage test was conducted on the polymer. The results are shown in FIG. 3.

EXAMPLE 2

Preparation of a Copolymer of 67% by Weight of Acrylamide and 33% by Weight of Sodium Acrylate Free-radical oxygen scavenger: sodium 2-mercaptobenzothiazole (0.5% by weight based on monomers)
Initiation at: 0° C.
pH 6.5
Monomer concentration: 30% by weight The procedure was as in example 1, except that the amount of the free-radical scavenger was altered. The results are summarized in table 1.

EXAMPLE 3

Preparation of a Copolymer of 67% by Weight of Acrylamide and 33% by Weight of Sodium Acrylate Free-radical oxygen scavenger: sodium 2-mercaptobenzothlazole (1.08% by weight based on monomers)
Initiation at: 0° C.
pH 6.5
Monomer concentration: 30% by weight The procedure was as in example 1, except that the amount of the free-radical scavenger was altered. The results are summarized in table 1.

EXAMPLE 4

Preparation of a Copolymer of 67% by Weight of Acrylamide and 33% by Weight of Sodium Acrylate Free-radical oxygen scavenger: sodium 2-mercaptobenzothlazole (0.5% by weight based on monomers)
Initiation at: 0° C.
pH 6.0
Monomer concentration: 30% by weight The procedure was as in example 2; the amount of the free-radical scavenger, the pH and the initiator system were altered. Rather than an aqueous solution of sodium sulfite, 0.8 g of a 1% aqueous solution of sodium hydroxymethanesulfinate (Rongalit® C) was used. In addition, the amount of t-butyl hydroperoxide was increased to 0.4 g of a 1% aqueous solution. The results are summarized in table 1.

EXAMPLE 5

Preparation of a Copolymer of 67% by Weight of Acrylamide and 33% by Weight of Sodium Acrylate Free-radical oxygen scavenger: sodium 2-mercaptobenzothlazole (0.5% by weight based on monomers)
Initiation at: 0° C.
pH 6.0
Monomer concentration: 30% by weight The procedure was as in example 4, except that 0.38 g of a 1% aqueous solution of sodium hydroxymethanesulfinate (Rongalit® C) was used and, in addition, 0.1 g of a 1% aqueous solution of ammonium iron sulfate was added with the other initiators. The results are summarized in table 1.

EXAMPLE 6

Copolymer of 50% by weight of acrylamide, 48% by weight of NaATBS (sodium salt of 2-acrylamido-2-methylpropanesulfonic acid) and 2% by weight of the amphiphilic monomer $H_2C\!=\!CH\!-\!O\!-\!(CH_2)_4\!-\!O\!-\!(EO)_{24.5}(BuO)_{16}(EO)_{3.5}$
Free-radical oxygen scavenger: sodium 2-mercaptobenzothiazole (0.35% by weight based on monomers)
Initiation at: 0° C.
pH 6.4
Monomer concentration: 37% by weight

Preparation Method

A plastic bucket with magnetic stirrer, pH meter and thermometer was initially charged with 146.5 g of a 50% aqueous solution of Na-ATBS and then the following were added successively: 105.8 g of distilled water, 0.4 g of a commercial silicone-based defoamer (Dow Corning® Antifoam Emulsion RD), 2.8 g of the amphiphilic monomer, 138.2 g of acrylamide (50% solution in water), 1.2 g of a 5% aqueous solution of diethylenetriaminepentaacetic acid, pentasodium salt, 3.0 g of the nonionic surfactant $C_{13}$-(EO)$_{15}$H and 0.6 g of sodium 2-mercaptobenzothiazole.

After adjustment to pH 6.4 with a 20% or 2% sulfuric acid solution and addition of the rest of the water to attain the desired monomer concentration of 37% by weight (total amount of water minus the amount of water already added, minus the amount of acid required), the monomer solution was adjusted to the initiation temperature of 2° C. The solution was transferred to a thermos flask, the temperature sensor for the temperature recording was attached, the mixture was purged with nitrogen for 30 minutes and the polymerization was initiated with 1.6 ml of a 10% aqueous solution of the water-soluble azo initiator 2,2'-azobis(2-ethylpropionamidine) dihydrochloride (Wako V-50), 0.12 ml of a 1% t-BHPO solution and 0.24 ml of a 1% sodium sulfite solution. With the onset of the polymerization, the temperature rose to 80° C. to 90° C. within 25 min. A solid polymer gel was obtained.

After the polymerization, the gel was allowed to cool down to about 50° C. and the gel block was comminuted with the aid of a meat grinder. The gel granules obtained were dried in a fluidized bed dryer at 55° C. for two hours. A white, hard granular material was obtained, which was converted to a pulverulent state by means of a centrifugal mill. The results are summarized in table 1.

EXAMPLE 7

Preparation of a Copolymer of 50% by Weight of Acrylamide, 48% by Weight of NaATBS and 2% by Weight of the Amphiphilic Monomer
$H_2C\!=\!CH\!-\!O\!-\!(CH_2)_4\!-\!O\!-\!(EO)_{24.5}(BuO)_{16}(EO)_{3.5}$

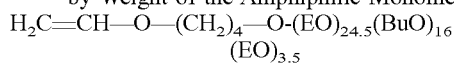

Free-radical oxygen scavenger: sodium 2-mercaptobenzothlazole (0.5% by weight based on monomers)
Initiation at: 2° C.
pH 6.4
Monomer concentration: 37% by weight The results are summarized in table 1.

EXAMPLE 8

Preparation of a Copolymer of 50% by Weight of Acrylamide, 48% by Weight of NaATBS and 2% by Weight of the Amphiphilic Monomer
$H_2C\!=\!CH\!-\!O\!-\!(CH_2)_4\!-\!O\!-\!(EO)_{24.5}(BuO)_{16}(EO)_{3.5}$

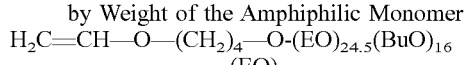

Free-radical oxygen scavenger: sodium 2-mercaptobenzothiazole (0.75% by weight based on monomers)
Initiation at: 2° C.
pH 6.4
Monomer concentration: 37% by weight The results are summarized in table 1.

COMPARATIVE EXAMPLE 1

Preparation of a Copolymer of 67% by Weight of Acrylamide and 33% by Weight of Sodium Acrylate Free-radical oxygen scavenger:
Initiation at: 0° C.
pH 6.5
Monomer concentration: 30% by weight The procedure was as in example 1, except that the free-radical scavenger was omitted. The results are summarized in table 1. In addition, a long-term storage test on the polymer was conducted. The results are shown in FIG. 3.

COMPARATIVE EXAMPLE 2

Preparation of a Copolymer of 67% by Weight of Acrylamide and 33% by Weight of Sodium Acrylate Free-radical oxygen scavenger: sodium 2-mercaptobenzothlazole (1.08% by weight based on monomers)
Initiation at: 00° C.
pH 6.5
Monomer concentration: 30% by weight The procedure was as in example 1, except that the solution of the monomers was cooled only to +10° C. The results are summarized in table 1.

COMPARATIVE EXAMPLE 3

Preparation of a Copolymer of 67% by Weight of Acrylamide and 33% by Weight of Sodium Acrylate Free-radical oxygen scavenger: sodium 2-mercaptobenzothiazole (1.08% by weight based on monomers)
Initiation at: 0° C.
pH 8
Monomer concentration: 30% by weight The procedure was as in example 1, except that the pH was adjusted not to 6.5 but to 8. After the initiation at 0° C., the polymerization did not start up. The results are summarized in table 1.

COMPARATIVE EXAMPLE 4

Preparation of a Copolymer of 67% by Weight of Acrylamide and 33% by Weight of Sodium Acrylate Free-radical oxygen scavenger: sodium 2-mercaptobenzothiazole (0.5% by weight based on monomers)
Initiation at: 0° C.
pH 6.5
Monomer concentration: 20% by weight The procedure was as in example 2, except that a total monomer concentration of only 20% by weight was selected. After the polymerization had started up, the temperature rose only to about 35° C. The residual acrylamide content after the polymerization was about 5000 ppm; In the inventive polymers, the residual content is less than 1000 ppm, typically less than 400 ppm. The gel content of the copolymer is high. The results are summarized in table 1.

COMPARATIVE EXAMPLE 5

Preparation of a Copolymer of 50% by Weight of Acrylamide, 48% by Weight of NaATBS and 2% by Weight of the amphiphilic monomer $H_2C=CH-O-(CH_2)_4-O-(EO)_{24.5}(BuO)_{16}(EO)_{3.5}$ Free-radical oxygen scavenger:
Initiation at: 2° C.
pH 6.4
Monomer concentration: 37% by weight The procedure was as in example 6, except that the free-radical scavenger was omitted. The results are summarized in table 1.

TABLE 1

Compilation of results

| No. | Inhibitor Type | Inhibitor % by wt. | Monomers Type | Monomers [% by wt.] | pH | Initiation temperature [° C.] | Polymer Gel content | MFR | Viscosity [mPas] | Comments |
|---|---|---|---|---|---|---|---|---|---|---|
| C1 | — | — | 67% AM, 33% NaA | 30 | 6.5 | 0 | 1-2 ml | 1.28 | 30 | |
| C2 | 2-MBT | 1.08% | 67% AM, 33% NaA | 30 | 6.5 | 10 | 2 ml | 1.30 | 26 | |
| C3 | 2-MBT | 1.08% | 67% AM, 33% NaA | 30 | 8 | 0 | — | — | — | Polymerization did not start up |
| 1 | 2-MBT | 0.35% | 67% AM, 33% NaA | 30 | 6.5 | 0 | 0 ml | 1.08 | 38 | |
| 2 | 2-MBT | 0.5% | 67% AM, 33% NaA | 30 | 6.5 | 0 | <1 ml | 1.05 | 38 | |
| C4 | 2-MBT | 0.5% | 67% AM, 33% NaA | 20 | 6.5 | 0 | 5 ml | 1.74 | 35 | Polymer comprises 5000 ppm of acrylamide |
| 3 | 2-MBT | 1.08% | 67% AM, 33% NaA | 30 | 6.5 | 0 | 1 ml | 1.27 | 31 | |
| 4 | 2-MBT | 0.5% | 67% AM, 33% NaA | 30 | 6.0 | 0 | <1 ml | 1.09 | 35 | Sodium hydroxymethanesulfinate rather than sodium sulfite |
| 5 | 2-MBT | 0.5% | 67% AM, 33% NaA | 30 | 6.0 | 0 | <1 ml | 1.02 | 49 | |
| C5 | — | — | 50% AM, 48% NaATBS, 2% X | 37 | 6.0 | 2 | 1 ml | 1.28 | 130* | |
| 6 | 2-MBT | 0.35% | 50% AM, 48% NaATBS, 2% X | 37 | 6.0 | 2 | 0 ml | 1.06 | 144* | |
| 7 | 2-MBT | 0.5% | 50% AM, 48% NaATBS, 2% X | 37 | 6.0 | 2 | <1 ml | 1.08 | 150* | |
| 8 | 2-MBT | 0.75% | 50% AM, 48% NaATBS, 2% X | 37 | 6.0 | 2 | 1 ml | 1.16 | 144* | |

*Viscosity data were recorded at 60° C. in synthetic seawater.

Abbreviations: acrylamide: AM; sodium acrylate: NaA, $H_2C=CH-O-(CH_2)_4-O-(EO)_{24.5}(BuO)_{16}(EO)_{3.5}$: X, NaATBS: sodium salt of 2-acrylamido-2-methylpropanesulfonic acid Commentary on the Experiments:

The examples and comparative examples show that the pH plays an important role when the polymerization is to be initiated at low temperatures. At pH 8 and 0° C., the polymerization did not start up at all.

Polymerization with an initiation temperature of 10° C. is possible, but the viscosity of the polymer obtained is lower than in the case of an initiation temperature of 0° C. and the gel content is greater.

Too low a monomer concentration in the aqueous solution leads to an inadequate temperature rise and to a poor-quality copolymer.

The long-term test (FIG. 3) with polymer 1 and polymer C1 shows that the viscosity of polymer C1 (i.e. without 2-MBT) decreases significantly in the course of storage. The viscosity of polymer 1 does not decrease under the same conditions, but actually increases slightly. The activity of 2-MBT with regard to the protection of the polymer is thus not harmed when 2-MBT is added actually before rather than after the polymerization.

The invention claimed is:

1. A process for preparing water-soluble homopolymers or copolymers comprising (meth)acrylamide by free-radical polymerization of an aqueous solution of ethylenically unsaturated monomers comprising at least (meth)acrylamide in the presence of at least one stabilizer, wherein the polymerization is a gel polymerization, and the process comprises at least the following steps:
   (I) providing an aqueous monomer solution comprising water,
      25 to 45% by weight based on the amount of all the components of the aqueous solution of ethylenically unsaturated monomers (A), where at least 70% by weight of the monomers are monoethylenically unsaturated, hydrophilic monomers (A1), with the proviso that at least one of the monomers (A1) is (meth)acrylamide,
      0.1 to 2% by weight —based on the sum total of all the monomers —of at least one stabilizer (B) for prevention of polymer degradation by molecular oxygen, the at least one stabilizer selected from the group of sulfur compounds, sterically hindered amines, N-oxides, nitroso compounds, aromatic hydroxyl compounds and ketones,
      an azo initiator (C) having a 10 h half-life of 40° C. to 75° C., where the aqueous monomer solution
      has a pH of <7,
      is at a temperature of <5° C., and
      has been inertized,
   (II) adding at least one redox initiator (D) to the aqueous monomer solution at a temperature of less than 5° C.,
   (III) polymerizing the aqueous monomer solution under essentially adiabatic conditions, the initiation temperature of the polymerization being less than 5° C., to provide a reaction mixture that is heated with the heat of polymerization to a temperature of 60° C. to 100° C., to provide a polymer gel, and
   (IV) drying the polymer gel.

2. The process according to claim 1, wherein the at least one stabilizer (B) is selected from the group of thiourea, N,N'-dimethylthiourea, N,N'-diethylthiourea, N,N'-diphenylthiourea, thiocyanates, tetramethylthiuram disulfide, 2-mercaptobenzothiazole or salts thereof, 2-mercaptobenzimidazole or salts thereof, sodium dimethyldithiocarbamate, 2,2'-dithiobis(benzothiazole), 4,4'-thiobis(6-t-butyl-m-cresol), dicyandiamide, guanindine, cyanamide, paramethoxyphenol, 2,6-di-t-butyl-4-methylphenol, butylhydroxyanisole, 8-hydroxyquinoline, 2,5-di(t-amyl) hydroquinone, 5-hydroxy-1,4-naphthoquinone, dimedone, propyl 3,4,5-trihydroxybenzoate, ammonium N-nitrosophenylhydroxylamine, 4-hydroxy-2,2,6,6-tetramethyoxylpiperidine, (N-(1,3-dimethylbutyl)-N'-phenyl-p-phenylenediamine and 1,2,2,6,6-pentamethyl-4-piperidinol.

3. The process according to claim 1, wherein the stabilizer (B) is 2-mercaptobenzothiazole or a salt thereof.

4. The process according to claim 1, wherein the initiation temperature of the polymerization is of −4° C. to +4° C.

5. The process according to claim 1, wherein the reaction mixture is heated to a temperature of 80° C. to 100° C.

6. The process according to claim 1, wherein the pH of step (I) is adjusted to 6 to 6.5.

7. The process according to claim 1, wherein the concentration of the monomers is 30 to 40% by weight.

8. The process according to claim 1, wherein the proportion of (meth)acrylamide is at least 30% by weight based on the sum total of all the monomers.

9. The process according to claim 1, wherein the proportion of (meth)acrylamide is at least 50% by weight based on the sum total of all the monomers.

10. The process according to claim 1, wherein the polymerization is conducted in a conical reactor.

11. The process according to claim 10, wherein the conical reactor is a tubular reactor (1) which has a diameter D1 and narrows conically (2) at the lower end, where the diameter at the end of the conical narrowing is D2, the ratio D1/D2 is 2:1 to 25:1 and the angle α between the wall in the cylindrical section (1) and the wall in the region of the conical narrowing (2) is more than 120° and less than 180°, and the tubular reactor including a shut-off device (3) arranged at the lower end of the conical narrowing and at least one feed (4) at the upper end of the reactor, and
   at least step (I) is undertaken in suitable mixing and cooling devices outside the conical reactor,
   the cooled monomer solution is transferred from the suitable mixing and cooling devices to the feed (4) into the reactor, and
   after the polymerization, the shut-off device (3) is opened, and injecting at least one gas through the feed (4), the polymer gel (5) is forced out of the reactor through the opened shut-off device.

12. The process according to claim 11, wherein the adding of the solution of the redox initiator (D) is conducted during the feeding of the monomer solution through the feed (4).

13. A process for preparing water-soluble homopolymers or copolymers comprising (meth)acrylamide by free-radical polymerization of an aqueous solution of ethylenically unsaturated monomers comprising at least (meth)acrylamide in the presence of at least one stabilizer, wherein the polymerization is a gel polymerization and the process comprises at least the following steps:
   (Ia) providing an aqueous monomer solution comprising at least
      water,
      25 to 45% by weight —based on the amount of all the components of the aqueous solution —of ethylenically unsaturated monomers (A), where at least 70% by weight of the monomers are monoethylenically unsaturated, hydrophilic monomers (A1), with the proviso that at least one of the monomers (A1) is (meth)acrylamide,
      0.1 to 2% by weight —based on the sum total of all the monomers —of at least one stabilizer (B) for prevention of polymer degradation by molecular oxygen, the at least one stabilizer selected from the group of sulfur compounds, sterically hindered amines, N-oxides, nitroso compounds, aromatic hydroxyl compounds and ketones, an azo initiator (C) having a 10 h half-life of 40° C. to 75° C., a photoinitiator (E), where the aqueous monomer solution has a pH of <7, is at a temperature of <5° C. and has been inertized, (IIIa) polymerizing the aqueous monomer solution under essentially adiabatic conditions, the initiation temperature of the polymerization being less than 5° C. and the polymerization being triggered by irradiation of the monomer solution with UV radiation, to provide a reaction mixture that is heated with the heat of polymerization to a temperature of 60° C. to 100° C., to provide a polymer gel, and (IV) drying the polymer gel.

14. The process according to claim 1, wherein the at least one of the monomers (A1) is selected from sodium acrylate or sodium salt of 2-acrylamido-2-methylpropanesulfonic acid.

15. The process according to claim 14, wherein the polymer gel has an MPFR value of 1.02 to 1.16.

16. The process according to claim 14, wherein the polymer gel has an MPFR value of 1.02 to 1.09.

17. The process according to claim 1, wherein the pH of step (I) is adjusted to 5 to 6.9.

18. The process according to claim 14, wherein the pH of step (I) is adjusted to 5 to 6.9.

* * * * *